UNITED STATES PATENT OFFICE.

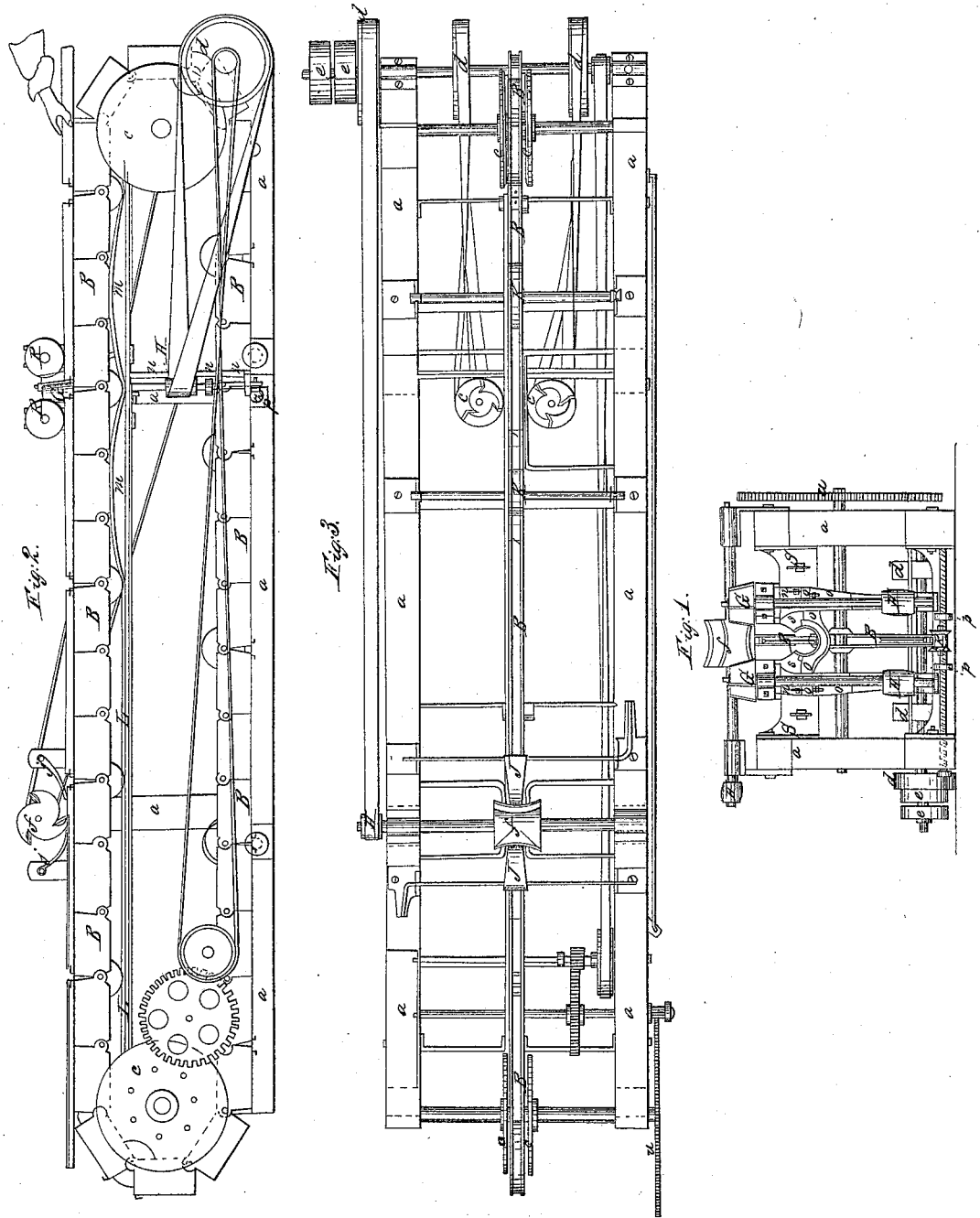

JOHN McMURTRY, OF LEXINGTON, KENTUCKY.

STAVE-MACHINE.

Specification of Letters Patent No. 15,429, dated July 29, 1856.

*To all whom it may concern:*

Be it known that I, JOHN McMURTRY, residing in the county of Fayette and State of Kentucky, have invented a new and useful Improvement on Machines for Jointing and Dressing Staves; and I do hereby declare that the following is a full, clear, and exact description of the construction and operation of the same, reference being had to the annexed drawings, making a part of this specification, in which—

Figure 1 is a transverse sectional elevation. Fig. 2 is a longitudinal sectional elevation. Fig. 3 is a top view of same, reference being had to said drawings and to the letters of reference marked thereon.

The letters of reference on the plans Figs. 1 2 and 3, correspond with each other and the same letters on the model accompanying these drawings refer to the same parts as the letters in drawings above referred to. These plans and sections show the arrangement of the machinery (with the exception of some additional improvements hereafter described). The whole as shown in drawings and model as above referred to, represents an improved machine for jointing and dressing staves for all kinds of cooperage on principles that are adapted to all kinds of cooperage and capable of taking the rough stave and dressing and finishing the same in the most perfect and accurate manner. This machine is also capable in principle, of all of the changes necessary in order to make all of the varieties of cooperage varying from the smallest paint keg up to the largest sized hogshead and performing its work in the most efficient rapid and perfect manner.

Detailed description of said machine as follows: $a, a, a$, represents the frame for sustaining the different parts of the machinery; B, B, B, the endless chain; $i, i, i$, the dogs on the endless chain for holding the ends of the stave; $c, c, c$, the carrying shives for operating the chain B; $d, d, d$, the driving pulleys of the cutterheads G, G, and $f$; $e, e$, the loose and tight pulleys of the driving shaft; $f$, cutterhead for dressing the surface of the stave; G, G, the cutterheads for dressing the edges of the stave; H, H, the driving pulley of the surface cutter; I, I, the dogs of the endless chain; J, J, the springs for holding down the stave on the endless chain on each side of surface cutter; K, K, the pressure rollers on each side of the side cutters for holding down the stave on the endless chain; L, L, the V way and flanges sustaining same for carrying the rollers in the endless chain; $m, m$, that portion of the V way on each side of the cutterheads G, G, that is bilged in form equal to the bilge of the cooperage desired; $n, n$, the metal frame holding the shafts of the cutterheads G, G, for dressing the edges of the stave; O, O, the hinge attached to metal frame $n, n$, that works on the center of the cooperage; P, P, the nuts that work on the right and left screw 2, for the purpose of moving the frame $n, n$, to and from the center of the endless chain; R, R, the carrying rollers for sustaining the endless chain at the bottom; S, S, the metal cross bar on which the rim forming the center for the hinge O, O, to work or move on; $u$, the driving wheel for the feed motion; $v$, the driving wheel for the feed motion.

The main features and the construction of this machine are indicated by the references above to its different parts as shown in the plans and model annexed.

Having described and referred to the different parts of said machine, I will endeavor to give a description of its different parts in connection with each other and their operation.

The endless chain B, B, is made of metal in links as shown; the joints being fitted in hinge form and made and planed up in the neatest and most accurate manner and arranged in links of three or more that shall be long enough to suit the longest length of stave desired to be dressed by the machine, and at the ends of every series of links there is a carrying wheel, the edge or rim of which is cut in proper shape so as to run on a metal way, the top of which is of a V shape. All of the joints of the chain are made to fit accurate and square, so as to make the chain straight on its top edge, excepting the joints at the carrying wheels, which are made of obtuse form, so as to permit the chain to change its form freely beyond a straight line on its top, for the following reasons to wit:

It will be observed the V way spoken of above (or that part of it marked M, M,) is made undulating or bilged on each side of the conical cutterheads G, G, in length just equal to the length from center to center of the carrying rollers in the chain B, B, and bilged in the same form as the cooperage the machine is desired to make:—This endless chain B, B, is held by carrying shives at either end of the machine at c, c, and propelled from the rear forward by the usual feed motion u, v, &c., as shown in plans and model. The top of the chain B, B, in passing over the undulations of the V way M, M, sink below a straight line, when one roller is on that part of the V way M, M, and the other roller is on the level part of the V way, and hence the necessity of the obtuse joint in the top of the chain at each one of the rollers. The top of the endless chain is made with a groove of sufficient depth and width to admit dogs or catches as shown in plan I, I, to hold the staves firmly while passing through the different cutters. These dogs or catches are made with slots, so that by loosening the bolts that confine them to their place they may be changed to suit the different lengths of staves.

The staves are fed into the machine at the rear end as shown in Fig. 2, and pass between the cutter-heads G, G, and held down firmly by the pressure rollers R, R. The end of the stave is presented to the cutter heads G, G, just as the rollers of the chain carrying the stave commences ascending the bilged part of the V ways M, M, and as they proceed continue to rise until they reach the center of the bilged way and also the center of the stave and then they commence descending until they reach the level part of the V way and then passing under the surface cutterhead f, f, from which it passes and is delivered at the front end of the machine as shown at Fig. 2.

It will be remarked the cutterheads G, G, are made of conical form in which bits are adjusted, the edges of which coincide with a line drawn from the center of the hinge O, O, that works on S, S, as described above, which center is fixed to suit the diameter of the cooperage desired to be made, now that being the case and the stave (being caused by the means of the bilged way already described) to occupy or that part of it, as it passes between the cutterheads G, G, the exact position from the center of the hinge O, O, that such or the same parts occupy to the center of the cooperage they are destined to make when fitted to their proper place and as already explained the bits of the cutter-heads G, G, being in line with the center of the cooperage must of necessity as the stave is raised and lowered while passing between the cutter heads as already described dress the edge of the stave in the most perfect manner. These cutterheads G, G, are held in a metal frame as described, that is made to revolve at pleasure on the center of the cooperage as shown, this center may be changed at pleasure by loosening the bolts that confine the hinge O, attached to the frame n, n, that holds the cutter heads G, G, and spindles of same and thus loosening the bolts that confine the iron plate S, S, (on which the hinge works) to the metal frame a, a, and by these bolts above described working as they do in slots described from the center of the hinge O, O, can be moved up or down at pleasure and so lessen or increase the diameter of the cooperage desired to be made; for it is evident that to increase or lessen the distance of the center spoken of from the top of the chain on which the stave is held must necessarily increase or lessen the diameter of the cooperage; when the center is changed as desired the bolts may be all secured, the machine will dress the staves corresponding with the change.

To move or change the cutterheads so as to dress wider or narrower staves there is a right and left screw marked 2 with nuts working on the same marked P, P, to which are attached connection bars taking hold of the frames of the side cutters G, G, and when it is desired to change the position of the side cutters it can be done with perfect accuracy by turning the screw by means of a crank or wheel marked 2 as shown in plans and model, thereby causing the nuts on the screw to work to and from the center of the machine and in so doing move the frames holding the side cutters and cause the distance between them to be increased or lessened as desired and consequently making a wider or narrower stave as may be desired, and of the right bilge and bevel; the surface cutter is arranged to be raised or lowered to suit the different thicknesses of staves; staves are held down firmly on the endless chain by means of pressure rollers worked by means of springs or weights; on each side of the surface cutter are used curved leaves as shown in the plan Fig. 2 so as the more perfectly to hold the stave in position, which may be operated by same means as the pressure rollers above described.

What I claim is—

1. The combination of the endless chain or its equivalent with the undulating bed or bearing, and the combination of these two devices with the planers for dressing the outer surface and beveling the two edges to suit any size cask required in the manner set forth, substantially herein.

2. I claim the obtuse joint in the endless chain B, B, at the carrying wheel for the purposes herein specified.

JNO. McMURTRY.

Witnesses:
THOS H. BARLOW,
JOHN S. HOLLINGSHEAD.